(12) United States Patent
Bowsher

(10) Patent No.: US 7,063,165 B2
(45) Date of Patent: Jun. 20, 2006

(54) TURF BLADE AND AERATOR

(75) Inventor: Neil Edwin Bowsher, Sullivan, IL (US)

(73) Assignee: Agri-Fab Inc., Sullivan, IL (US)

( * ) Notice: Subject to any disclaimer, the term of this patent is extended or adjusted under 35 U.S.C. 154(b) by 0 days.

(21) Appl. No.: 10/939,702

(22) Filed: Sep. 13, 2004

(65) Prior Publication Data

US 2006/0054332 A1   Mar. 16, 2006

(51) Int. Cl.
*A01B 45/02*   (2006.01)
(52) U.S. Cl. .......................... 172/21; 172/604
(58) Field of Classification Search ............... 172/21, 172/22, 604
See application file for complete search history.

(56) References Cited

U.S. PATENT DOCUMENTS

| | | | |
|---|---|---|---|
| 1,702,707 A | 2/1929 | Sleffel | |
| 2,691,933 A | 10/1954 | Emerson | |
| 2,881,848 A * | 4/1959 | Liston | ......................... 172/555 |
| 3,460,629 A | 8/1969 | Shapland, Jr. et al. | |
| 3,939,917 A * | 2/1976 | Reed et al. | ..................... 172/21 |
| 3,993,143 A | 11/1976 | Moreland, Jr. | |
| 4,047,576 A * | 9/1977 | Rau et al. | ..................... 172/540 |
| 4,202,414 A | 5/1980 | vom Braucke et al. | |
| 4,421,176 A * | 12/1983 | Tuggle et al. | .................. 172/41 |
| 4,494,365 A * | 1/1985 | Lloyd | ........................... 56/256 |
| 5,183,120 A | 2/1993 | Watanabe | |
| 5,662,172 A | 9/1997 | Brown | |
| 6,484,811 B1 * | 11/2002 | Edwards | ....................... 172/21 |
| 6,712,155 B1 * | 3/2004 | Dufty | ........................... 172/21 |
| 2003/0201106 A1 | 10/2003 | Jessen | |

FOREIGN PATENT DOCUMENTS

| | | |
|---|---|---|
| EP | 0472102 | 2/1992 |
| FR | 2577103 | 8/1986 |

* cited by examiner

*Primary Examiner*—Meredith Petravick
*Assistant Examiner*—Alexandra Pechhold
(74) *Attorney, Agent, or Firm*—Vedder Price Kaufman & Kammholz

(57) ABSTRACT

A planar, turf cutter blade formed from either high carbon or stainless steel has planar cutting teeth that extend radially from the periphery of a central part of a planar disc in which a centrally located hole is formed. A turf aerator that uses the turf cutter blades aerates turf by slicing or cutting turf and does not punch holes into the turf.

12 Claims, 4 Drawing Sheets

TURF BLADE AND AERATOR

BACKGROUND

This invention relates to grass or lawn maintenance equipment. More particularly, this invention relates to an aerator blade and a turf aerator.

Lawn or turf maintenance often includes the application of dry and liquid materials including seed, fertilizer, and pesticides, as well as mechanical processes including mowing and aerating. Aeration is a process of penetrating the thatch that overlies turf, penetrating the turf itself and finally penetrating the underlying soil to provide a passageway through which air, water and fertilizer can pass into the soil. Aeration is known to be beneficial to turf in that it reduces diseases and thatch buildup and allows air and water to penetrate into the soil. There are two known methods of aerating the turf. One is called plug aeration which it removes plugs of turf and soil and the other is spike aeration where the spikes only penetrate through the turf and into the soil.

One problem with the known methods of aerating turf is that the process of plug aeration leaves conspicuous and unsightly plugs of thatch, turf and soil on the turf surface. The other known method of spike aeration compacts the soil beneath and around the hole-forming spikes and over time, the process of aerating soil by spike aeration can actually exacerbate the soil compaction problem that aerating was supposed to cure. A turf aerator that does not compact underlying soil and which does not create unsightly plugs would be an improvement over the prior art.

SUMMARY

A planar, aerator blade has several co-planar teeth that are formed from a single metal disc such that the teeth of the aerator blade extend from and are distributed around the circumference of a central section of the disc. The teeth penetrate the turf and underlying soil. However, as they are removed from this penetration in a circular motion, they pry up small pieces of turf and soil. The removal of this relatively un-noticeable amount of material, has not only aerated the turf, but by definition, has lowered the compaction of the soil.

In the one embodiment, each of the teeth that extend from the aerator blade has a leading edge that is formed by two straight edge segments. A "first straight edge segment," which is closest to the center of the aerator blade, is formed to be a straight length of the material from which the aerator blade is formed. A second straight edge segment extends from the termination of the first straight edge segment, albeit at an angle to the first straight edge segment. The angle between the two, straight edge segments is obtuse. Each tooth has an elliptical trailing edge that extends from the third point back to a fourth point outside the central part. In an alternate embodiment, the aerator blade has several planar teeth, each of which is shaped as a cusp. In every embodiment, the aerator blades (including the teeth) are planar, which means that the edges of the teeth do not curl away from the plane in which the aerator blades rotate.

A turf aerator uses several of the aforementioned aerator blades. The aerator blades rotate on a horizontal shaft that is supported by a frame. A tow arm that extends orthogonally from the frame can be connected to a vehicle so that the aerator blades penetrate and pry up soil and turf as the turf aerator is pulled along over a turf surface.

BRIEF DESCRIPTION OF THE DRAWINGS

Certain embodiments are shown in the drawings. However, it is understood that the present disclosure is not limited to the arrangements and instrumentalities shown in the attached drawings, wherein.

DETAILED DESCRIPTION OF THE PREFERRED EMBODIMENTS

Figure 1:
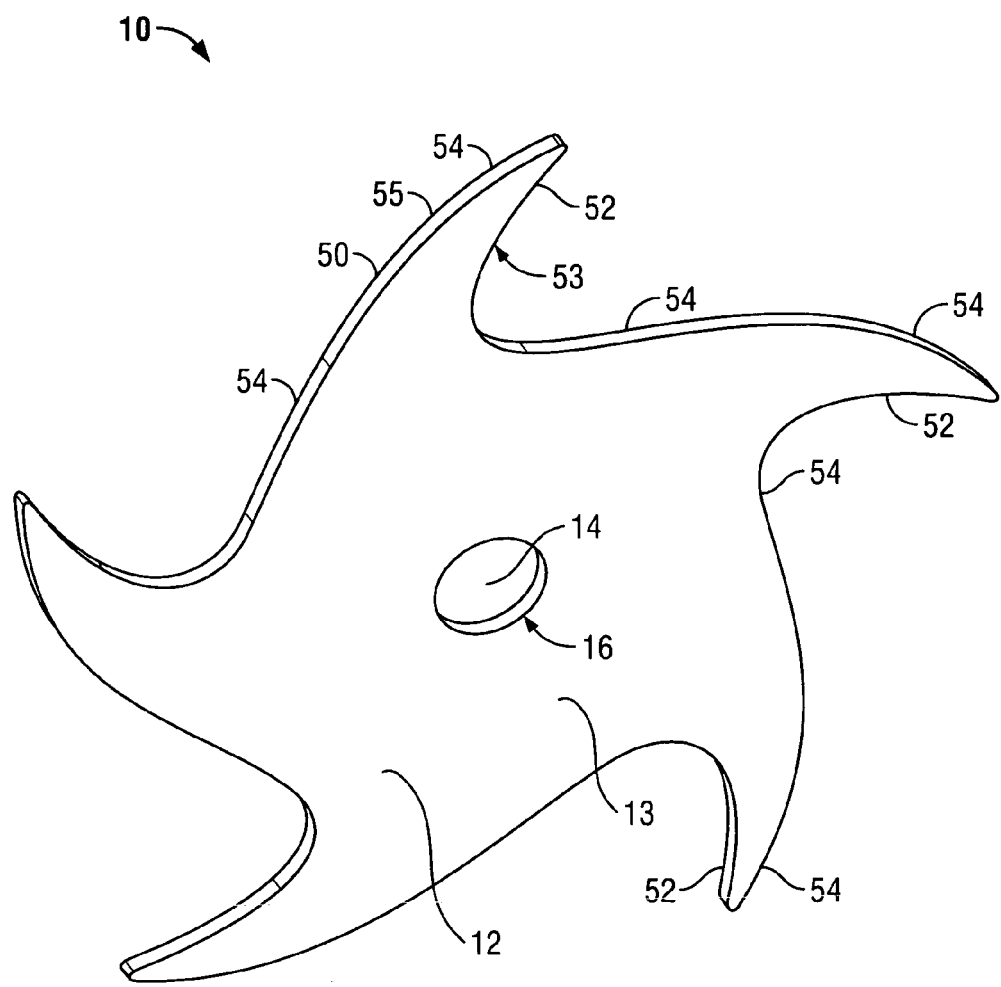
FIG. 1 is a perspecitive view of an embodiment of a turf aerator blade.

For the purposes of promoting an understanding of the principles disclosed herein, reference will now be made to the preferred embodiments illustrated in the drawings and specific language will be used to describe the same. It will nevertheless be understood that no limitation of the scope is thereby intended, such alterations and further modifications in the illustrated device, and such further applications of the principles disclosed as illustrated therein being contemplated as would normally occur to one skilled in the art to which this disclosure relates.

Figure 2:
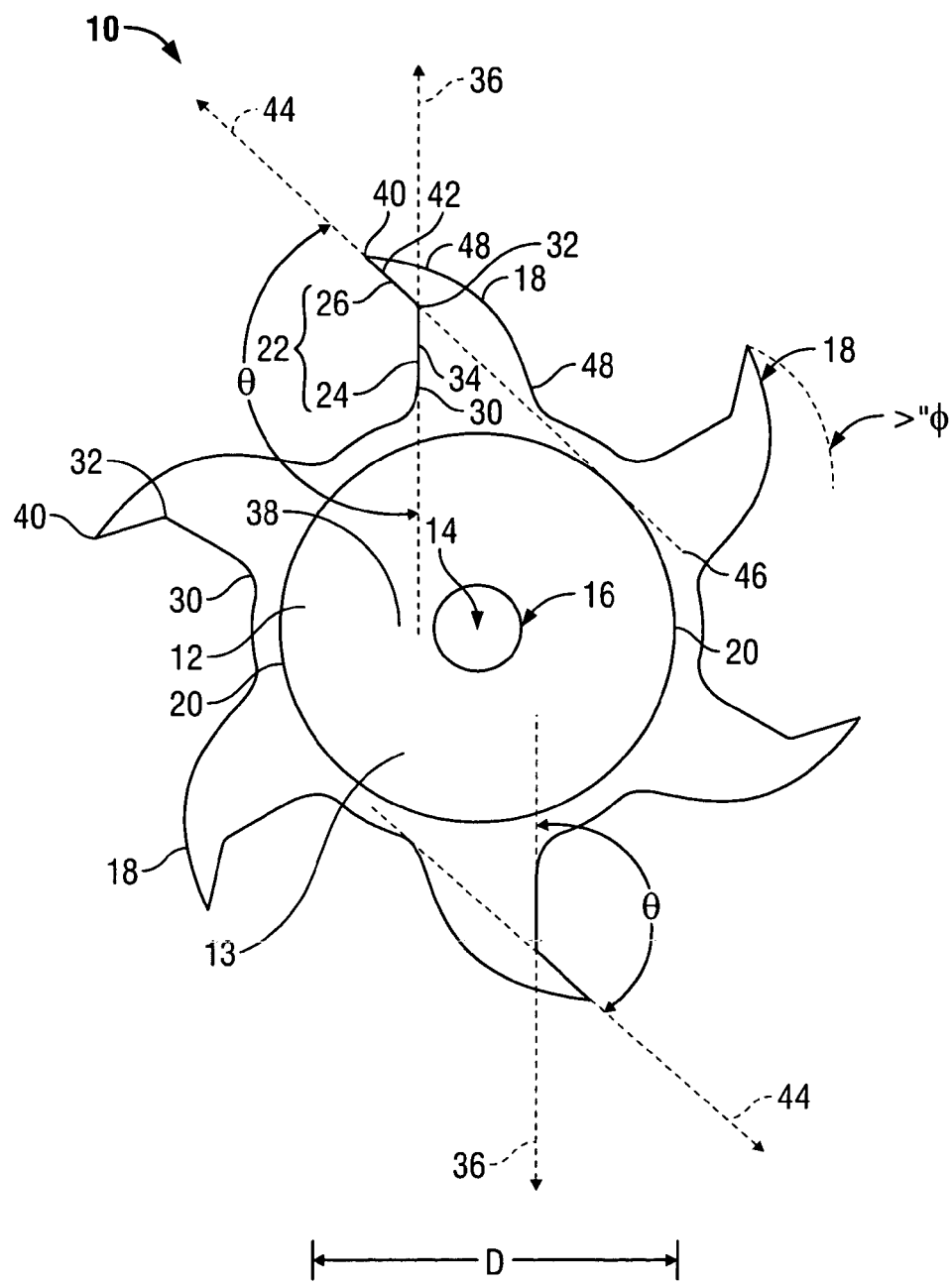
FIG. 2 is a side view of a turf aerator blade.

FIG. 2 is a side view of a embodiment of a blade 10 for aerating turf by cutting or slicing. Accordingly, the blade 10 is hereafter referred to as a turf "aerator blade" and is identified in the figures by reference numeral 10.

The aerator blade 10 is comprised of a substantially planar, metal disk 12 that has a central part or region that is identified by reference numeral 13. The central part 13 can be considered to have a diameter "D," measured from the aerator's axis of rotation 14, outwardly in opposite directions. The aforementioned axis of rotation 14 is also the center of a hole 16 in the central part 13 through which an aerator blade shaft extends, when the aerator blade 10 is installed into a soil aerator, such as the aerator shown in FIG. 3 and FIG. 4.

The planar disk 12 can be formed by casting, stamping, forging or machining so long as the central part 13 and the cutting teeth 18 are of substantially uniform thickness to allow the aerator blade 10 to slice or cut through thatch, turf and underlying soil instead of poking holes as do prior art aerators. By slicing the turf instead of poking holes, a more continuous air passageway is created without creating unsightly soil plugs. In addition to forming the disk 12 to have a substantially uniform thickness, it should be formed so that the cutting teeth 18 are evenly distributed around the circumference 20 of the planar disk 12 so that when they're used with an aerator, it will roll relatively smoothly across the turf.

The cutting teeth 18 of the aerator blade 10 are considered to have a leading cutting edge as well as a trailing edge. When the aerator blade 10 is installed in a turf aerator, it's forced to rotate about the axis of rotation 14 in a direction by which the "mouth" or opening between each cutter tooth 18 will bite into turf. The cutting edge of a tooth 18 is identified by reference numeral 22. It's considered to be the edge or side of a tooth 18 that cuts into the turf first as the cutter blade 10 is rolled over a turf surface. In other words, as the aerator blade 10 is rotated, the smoothly-contoured side 48 of a tooth 18 contacts the soil and acts as a pry point to lift a portion of the soil from the slit.

Each of the cutting teeth 18 on a cutter blade 10 has a leading cutting edge identified by reference numeral 22. In the embodiment shown in FIG. 2, each of these leading cutting edges 22 has two straight cutting edge segments.

The first straight cutting edge segment 24 is a straight length or "segment" of the planar disk 12 that extends between a first geometric point 30 just outside the diameter D and second geometric point 32 away from the first point 30. These first and second geometric points 30 and 32 are shown on FIG. 2 for illustration purposes only as they do not have physical existence on the aerator blade 10. They're depicted as lying along a geometric line segment identified in FIG. 2 by reference number 34. The line segment 34 is depicted as lying along a geometric ray 36 that has an origin point 38 to one side of the hole 16 as well as the axis of rotation 14. As shown in FIG. 2, the origin point 38 of the ray 36 is away from and to the left "side" of the hole 16. The ray 36 extends radially from its origin point 38 as shown.

A second straight cutting edge length or "segment," identified by reference numeral 26, extends from the aforementioned second point 32 to a third point 40 away from the second point, which is also the distal end of the cutting edge 22 of a tooth 18. The length of the first cutting edge segment 24 is substantially equal to the length of the second cutting edge segment 26. The third point 40, which is at one end of the second cutting edge segment 26 will penetrate the turf first as the cutter blade 10 rotates. The second point 32 and the third point 40 lie along a second geometric line segment 42. This second line segment 42 is depicted as lying along a second ray 44 that originates at its own origin point 46 inside the first diameter D, away from the hole 16 but on the other side or second side of the axis of rotation 14.

As shown in FIG. 2, each of the cutting teeth 18 also has a trailing edge 48 that is generally in the shape of a smooth curve in the general shape of an ellipse. In this embodiment, the trailing edge 48 of a cutting tooth 18 extends from the distal end 40 of each cutting tooth 18 in a smoothly-contoured curve, back toward the central part 13 of the blade 10.

Any edge that extends from the distal end 40, back toward the central part 13 and which does not cut or slice turf is considered to be a "trailing edge." For purposes of claim construction, the trailing edge 48 of each cutter is considered to be "elliptical" whether the trailing edge 48 is mathematically parabolic, hyperbolic, circular, straight or elliptical, or portions of two or more such curves. The trailing edge 48 is therefore considered to be an "elliptical" curve.

FIG. 1 shows an embodiment of an aerator blade 10 inclined to show its uniform thickness. In FIG. 1, the planar disk 12 has a centrally located axis of rotation 14 that is also the center of an included hole 16. The hole 16 receives a blade cutter shaft about which the aerator blade 10 can rotate.

As shown in FIG. 1, the aerator blade 10 is comprised of several, evenly-spaced planar "cusp-shaped" cutting teeth 50. Each of the cusp-shaped cutting teeth 50 extend outwardly away from the axis of rotation 14. The cusp-shaped cutting teeth 50 are formed by two separate curved sections 53 and 54, the radii of curvatures of which are different.

The "first" curved section 53 of a cutting tooth 50 is considered to be "inside" and has a smaller radius of curvature that the "second" curved section identified by reference numeral 55. It is considered to be the cutting edge 52. The second curved section 55 is considered to be a trailing edge 54 of the tooth 50 in FIG. 1.

In both embodiments of the aerator blade 10, the central part 12 and cutting teeth 18 are formed of a single piece of material. Casting, stamping, forging and machining are well-known methods by which the aerator blade 10 can formed to be single piece.

The aerator blade 10 is preferably formed from materials that are suitable for cutting into soil. The cutter blade material should be capable of retaining its sharpness yet be somewhat flexible in order to allow an aerator to turn without bending or breaking the cutter blades 10. Materials commonly known as high-carbon or stainless steel are known to be relatively hard and able to retain a cutting edge yet be flexible enough to allow a cutter blade 10 embedded in soil to cut a circular arc as an aerator is turned. One alternate embodiment uses a carbide tip on the cutting edge.

The cutter blade 10 is useable with an aerator by virtue of the hole 16 in the central part 13. In one embodiment of a turf aerator shown in FIG. 3 and FIG. 4, the aerator blades 10 are evenly spaced along and freely rotatable about a disk cutter shaft.

It should be noted that the hole 16 in each cutter blade 10 is orthogonal to the cutter blade. Therefore, when the cutter blades are assembled onto a straight disk cutter shaft, the cutter blades will be parallel to each other.

Figure 3:
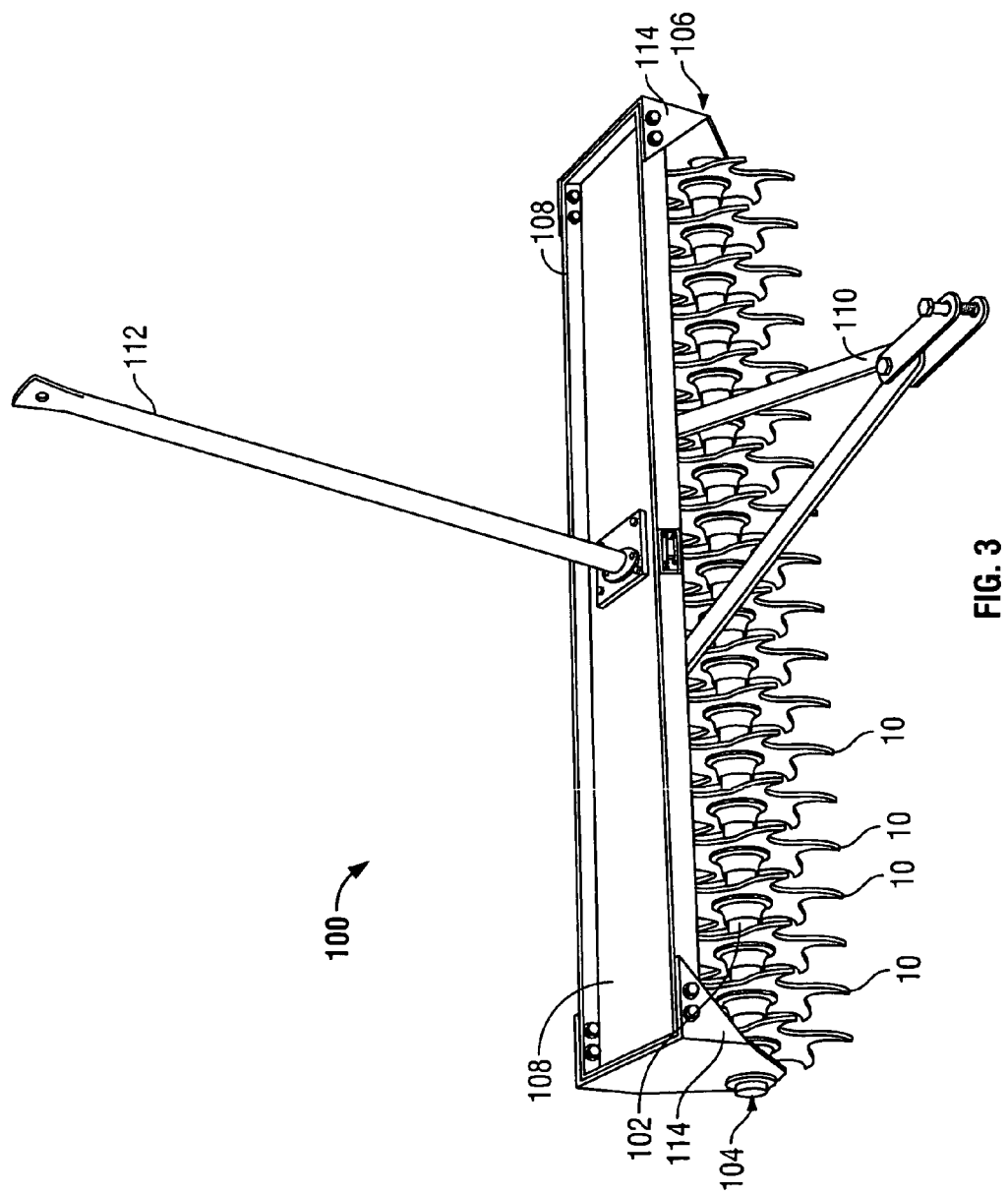
FIG. 3 is a perspective view of a turf aerator.

FIG. 3 is a front view of one embodiment of a turf aerator 100. The turf aerator 100 is comprised of a horizontal disk cutter shaft 102, which has first and second opposing ends 104 and 106. The ends 104 and 106 of the disk cutter shaft 102 are rotatably supported in the aerator frame 108.

Several of the aforementioned planar aerator disks 10 are evenly spaced along the horizontally-oriented disk cutter shaft 102. As set forth above, each of the planar aerator disks 10 has radially-extending teeth 18 that will cut slots into the soil beneath the aerator 100 as it's rolled over the turf.

In order to help insure that the teeth 18 penetrate underlying soil, weights can be added to the tray on the top of the frame 108. Adding weight to the aerator 100 will urge the teeth 18 of each blade 10 of the turf aerator 100 downward and into the turf, thatch and soil helping to ensure that the turf, thatch and underlying soil are slit or cut by the planar blades 10. A tow arm 110 provides a mechanism for pulling the aerator 100 over turf.

Figure 4:
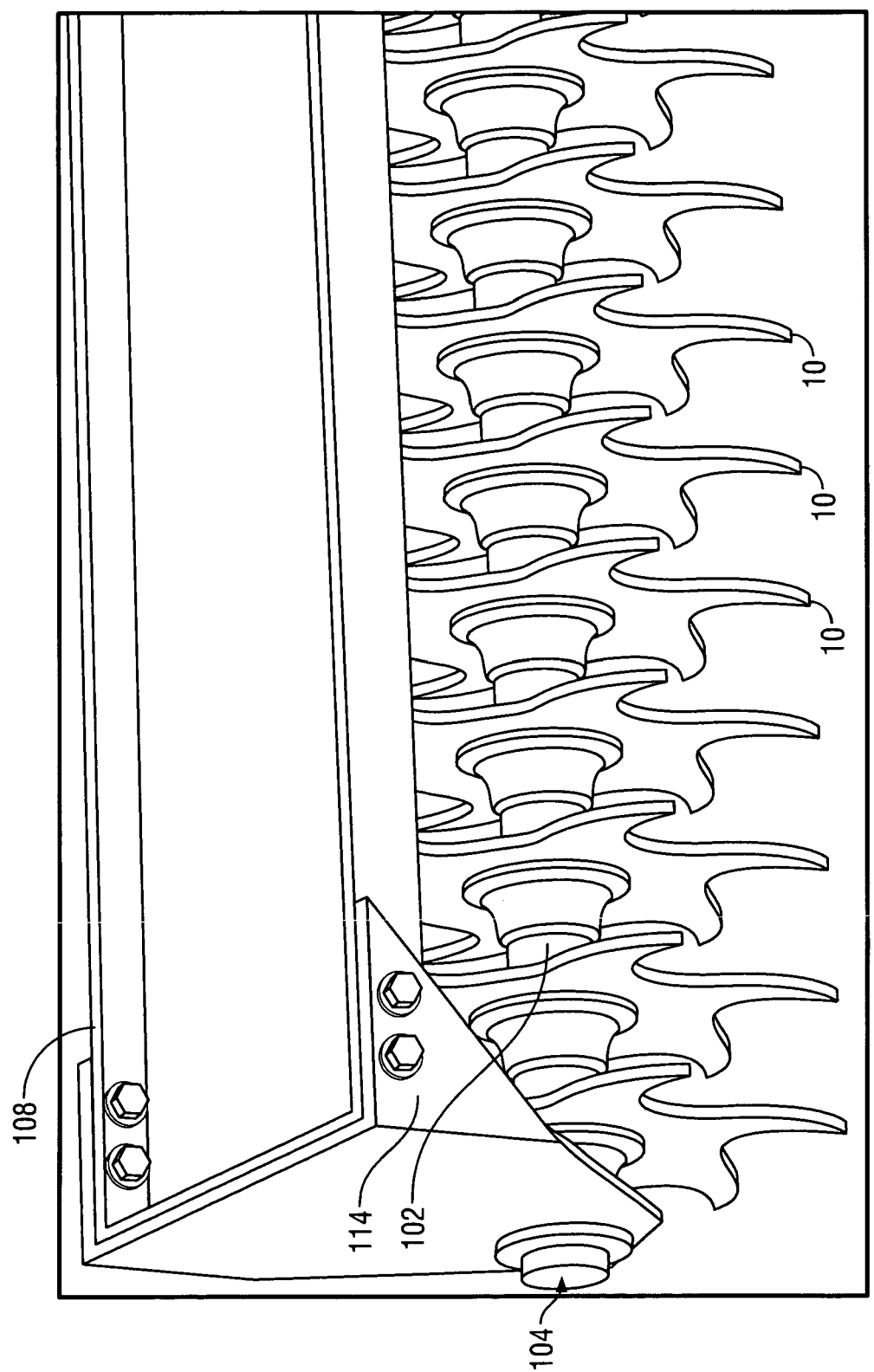
FIG. 4 is a detailed perspective view of a turf aerator.

Finally, FIG. 4 shows a portion of the turf aerator 100 shown in FIG. 3 enlarged to show the disk cutter shaft 102, the planarity of the cutter blades 10 and the spacing between them. In addition, a corner brace 114 adds structural rigidity to the turf aerator frame.

Furthermore, while the particular preferred embodiments have been sown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the related art.

What is claimed is:

1. A turf aerator comprising:
    (a) a horizontal disc cutter shaft having first and second ends that are supported in a disc carrier frame;
    (b) a plurality of rotating aerator planar discs, spaced along the horizontal disc cutter shaft, each planar disc having:
        (i) a central part of a first diameter and a centrally-located axis of rotation, said central part including a hole, centered on the axis of rotation and through which the disc cutter shaft extends, and (ii) a plurality of substantially planar cutting teeth distributed around the circumference of the planar disc and extending outwardly from and co-planar with the central part, and
  (1) each of the cutting teeth having a leading cutting edge formed by first and second straight cutting edge segments;
  (2) the first straight cutting edge segment being a first straight length of material that extends between first and second points that lie along a first line segment, the first and second points being outside the first diameter, the first line segment extending radially along a ray that originates at a first origin point that is inside the first diameter, away from the hole and on a first side of the axis of rotation, such that the ray is offset from the axis of rotation,
  (3) a second straight cutting edge segment being a second straight length of material that extends between the second point and a third point, in a direction of rotation, that both lie along a second line segment, the second line segment extending radially along a ray that originates at a second origin point that is inside the first diameter, away from the hole and on a second side of the axis of rotation, and
  (4) each cutting blade having an elliptical convex trailing edge that extends from the third point back to a fourth point outside the central part; and
(c) an arm, extending from and orthogonal to the disc carrier frame.

2. The turf aerator of claim 1, wherein each of the aerator planar discs are fixed to the disc cutter shaft.

3. The turf aerator of claim 1, further including a weight-retaining shaft.

4. The turf aerator of claim 1, wherein each of the aerator planar discs are freely rotatable about the disc cutter shaft.

5. The turf aerator of claim 1, wherein each of the aerator blades are comprised of at least one of: high-carbon steel and stainless steel.

6. The turf aerator of claim 1, wherein the cutting edge of each of the aerator blades is carbide tipped.

7. A turf aerator comprising:
(a) a round, horizontal disc cutter shaft having first and second ends that are rotationally supported in a disc carrier frame;
(b) a plurality of aerator planar discs, spaced along the horizontal disc cutter shaft, each planar disc having a central part with a hole, through which the disc cutter shaft extends, each of the aerator planar discs having:
  (i) a plurality of substantially planar cusp-shaped cutting teeth distributed around the circumference of the planar disc and extending outwardly from and co-planar with the central part, each of the cusp-shaped cutting teeth having a leading cutting edge formed by first curved section and a trailing edge formed by a second curved section, the radius of curvature of the first section being less than the radius of curvature of the second section;
(c) an arm, extending from and orthogonal to the disc carrier frame.

8. The turf aerator of claim 7, further including a weight-retaining shaft.

9. The turf aerator of claim 7, wherein each of the aerator planar discs are fixed to the disc cutter shaft.

10. The turf aerator of claim 7, wherein each of the aerator planar discs are freely rotatable about the disc cutter shaft.

11. The turf cutter of claim 7, wherein the turf cutter blade is comprised of at least one of: high-carbon steel and stainless steel.

12. The turf cutter of claim 7, wherein the cutting edge of each turf cutter blade is carbide tipped.

* * * * *